2,794,042

PREPARATION OF ALPHA-ALKOXYNITRILES

Charles C. Tanona, Charleston, and Leonard Pierce, Jr., Nitro, W. Va., assignors to Union Carbide and Carbon Corporation, a corporation of New York No Drawing. Application May 26, 1953,
Serial No. 357,638

11 Claims. (Cl. 260—465)

This invention relates to a new method for the production of alpha-alkoxynitriles, which comprises reacting anhydrous hydrogen cyanide with the dialkyl acetals. These compounds, also called 1-alkoxy-1-cyanoalkanes, are useful as solvents and as chemical intermediates, being used to make such compounds as alpha-alkoxy acids, amines, amides and ketones.

Several methods are known in the art for preparing these compounds. Henze and Murchison (J. Amer. Chem. Soc., 55, 4255–9) prepared them by the reaction of alpha-haloethers with metallic cyanides:

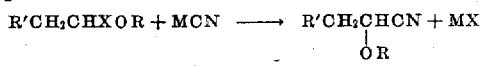

where X is the halogen atom, M is the metal atom such as Ag, K, or Na, and R' is H or an alkyl radical. This method, however, is only a laboratory preparation. The preparation of alpha-haloethers, the starting material, is a serious limitation to the products obtainable, and involves several steps, adding greatly to the expense.

W. Reppe (Modern Plastics 23, No. 6, 169–76, 218, 220) prepared alpha-alkoxypropionitriles by the reaction of hydrogen cyanide and ethers of vinyl alcohol, using basic catalysts such as pyridine:

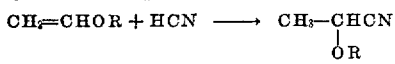

By this latter method, however, only alpha-alkoxypropionitriles can be prepared, whereas by the method of our invention, alpha-alkoxynitriles having chain lengths of more than three carbon atoms are made available.

We have discovered that dialkyl acetals, particularly the dialkyl acetals of aliphatic aldehydes, can be reacted with anhydrous hydrogen cyanide, to give alpha-alkoxynitriles. Anhydrous hydrogen cyanide must be used because hydrolysis of the acetal would result if an aqueous solution were used, due to the presence of an acid catalyst. None of the methods known in the art have produced these compounds from the acetals. Our reaction is illustrated by the following equation:

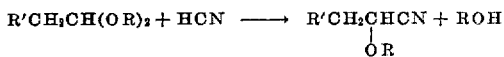

where R is an alkyl radical of the methyl, ethyl, propyl series and R' may be an aliphatic hydrocarbon radical including an alkyl radical such as methyl, ethyl, propyl; an alkenyl radical, such as ethenyl, propenyl; an alkinyl radical, such as ethinyl; or R' may be a cyclic hydrocarbon radical or an aromatic hydrocarbon radical including the aromatic radicals such as phenyl, alkyl phenyl, naphthyl or an alkyl naphthyl.

Alpha-alkoxynitriles which can be prepared from dialkyl acetals by the method of the invention include 1-butoxy-1-cyanoethane from dibutyl acetal, 1-ethoxy-1-cyanoethane from diethylacetal, 1-cyano-1-methoxybutane from dimethyl butyral, 1-methoxy-1-cyano-2-phenyl ethane from 1,1-dimethoxy-2-phenyl ethane and 1-ethoxy-1-cyanohexane from dimethyl hexal.

The reaction of the invention is carried out in the presence of an acid catalyst, preferably one of the Friedel-Crafts type, or a mineral acid, including aluminum trichloride, boron trichloride, stannic chloride, and hydrochloric acid, with boron trifluoride being preferred. A temperature of between 50° and 200° and autogenous pressure are maintained during the reaction period, pressure-tight equipment being used.

In order to inhibit any premature reaction, and because of the known hazards in using anhydrous hydrogen cyanide, the reactants are first cooled to a temperature of about 0° C., for instance in an ice slurry, before being fed into the pressure-tight reaction system. The length of the reaction period varies with the particular acetal being reacted, as well as with the temperature employed. To obtain the highest efficiency, the reaction period should be held to a minimum. We have found the time necessary to vary from 0.5 to 15 hours, with 0.5 to 2.0 hours being preferred for most applications.

The reaction is best suited to a continuous method of operation, where contact time can be held to the required minimum and maximum control of temperature is possible.

Due to the acidic nature of the catalysts used, the reaction product is neutralized with a basic compound such as soda ash. The neutralized material can then be refined by distillation at a suitable pressure. The distillation temperature varies with the particular alpha-alkoxynitrile being produced. The range is usually from approximately a temperature of 4° C. below the boiling point to a temperature of 2° C. above, if higher volatile fractions exist.

The following examples illustrate the invention.

Example I

A mixture of 143 grams (5.3 mols) of anhydrous hydrogen cyanide and 1400 grams (8.03 mols) of dibutyl acetal was cooled to a temperature of about 0° C. in an ice slurry and then charged into a three-liter capacity rocker bomb. Thirty grams of a 30 percent solution of boron trifluoride in diethyl ether was then added to the cooled mixture in the bomb. The bomb was then sealed and heated slowly to a temperature of 150° C. and held at this temperature for a period of 13 hours. The contents of the bomb were then cooled to room temperature and discharged into a still kettle containing 20 grams of soda ash, the soda ash being present for the purpose of neutralizing the acidic boron trifluoride catalyst. After this neutralization, the material was distilled at a pressure of 50 mm. of mercury absolute, and alpha-butoxypropionitrile was obtained with a distillation temperature of 88 to 89° C. The yield of 1-butoxy-1-cyano ethane and the efficiency of the reaction, both based on the quantity of hydrogen cyanide used, were respectively 23.5 and 31.0 percent.

Example II

A mixture of 159 grams (5.9 mols) of anhydrous hydrogen cyanide and 696 grams (5.9 mols) of diethyl acetal was cooled to a temperature of about 0° C. and then charged into a three-liter capacity rocker bomb. Thirty grams of a thirty percent solution of boron trifluoride in diethyl ether was then added to the cooled mixture in the bomb. The bomb was then sealed and heated slowly to a temperature of 108° C. and held at that temperature for a period of 3 hours. The contents of the bomb were then cooled to room temperature and discharged into a still kettle containing a small amount, about 20 grams, of soda ash, the soda ash being present for the purpose of neutralizing the acidic boron trifluoride catalyst. After this neutralization the material was distilled at atmospheric pressure, and 1-ethoxy-1- cyanoethane was obtained with a distillation temperature of 125° to 129° C. The yield of alpha-ethoxy-propionitrile and the efficiency, both based on the quantity of hydrogen cyanide used, were 23.6 and 48.0 percent respectively. Based on the quantity of diethyl acetal used, the yield and efficiency were respectively 23.6 and 26.1 percent.

*Example III*

A mixture of 218 grams (8.07 mols) of anhydrous hydrogen cyanide and 952 grams (8.07 mols) of dimethyl butyral (1,1-dimethoxybutane) was cooled to a temperature of about 0° C. and then charged into a three-liter capacity rocker bomb. Eight grams of a 27 percent solution of boron trifluoride in diethyl ether was then added to the cooled mixture in the bomb. The bomb was then sealed and heated slowly to a temperature of 75° C. and held at that temperature for a period of two hours. The contents of the bomb were then cooled to room temperature and discharged into a still kettle containing 10 grams of soda ash, the soda ash being present for the purpose of neutralizing the acidic boron trifluoride catalyst. After this neutralization, the material was distilled at a pressure of 50 mm. of mercury, and 1-cyano-1-methoxybutane was obtained with a distillation temperature of 175° C. The yield of 1-cyano-1-methoxybutane was 9 percent. The efficiencies of the reaction, based respectively on quantities of hydrogen cyanide and of dimethyl butyral used, were 71.4 and 30.0 percent.

What is claimed is:

1. A process for the production of alpha-alkoxynitriles comprising reacting a dialkyl acetal with anhydrous hydrogen cyanide at a temperature of 50° C. to 200° C. in the presence of an acidic catalyst.

2. A process for the production of alpha-alkoxynitriles comprising reacting a dialkyl acetal with anhydrous hydrogen cyanide under autogenous pressure and at a temperature of 50° to 200° C. in the presence of an acidic catalyst.

3. A process for the production of alpha-alkoxynitriles comprising reacting a dialkyl acetal of an aliphatic aldehyde with anhydrous hydrogen cyanide under autogenous pressure and at a temperature of 50° to 200° C. in the presence of an acidic catalyst.

4. A process for the production of alpha-alkoxynitriles comprising reacting a dialkyl acetal with anhydrous hydrogen cyanide under autogenous pressure and at a temperature of 50° to 200° C. in the presence of an acidic catalyst of the Friedel-Crafts type.

5. A process for the production of alpha-alkoxynitriles comprising reacting a dialkyl acetal with anhydrous hydrogen cyanide under autogenous pressure and at a temperature of 50° to 200° C. in the presence of a mineral acid catalyst.

6. A process for the production of alpha-alkoxynitriles comprising reacting a dialkyl acetal of an aliphatic aldehyde with anhydrous hydrogen cyanide under autogenous pressure and at a temperature of 50° to 200° C. in the presence of boron trifluoride.

7. A process for the production of 1-butoxy-1-cyanoethane comprising reacting dibutyl acetal with anhydrous hydrogen cyanide under autogenous pressure and at a temperature of 50° to 200° C. in the presence of an acidic catalyst of the Friedel-Crafts type.

8. A process for the production of 1-ethoxy-1-cyanoethane comprising reacting diethyl acetal with anhydrous hydrogen cyanide under autogenous pressure and at a temperature of 50° to 200° C. in the presence of an acidic catalyst of the Friedel-Crafts type.

9. A process for the production of 1-cyano-1-methoxybutane comprising reacting dimethyl butyral with anhydrous hydrogen cyanide under autogenous pressure and at a temperature of 50° to 200° C. in the presence of an acidic catalyst of the Friedel-Crafts type.

10. A process for the production of 1-methoxy-1-cyano-2-phenyl ethane comprising reacting 1,1-dimethoxy-2-phenyl ethane with anhydrous hydrogen cyanide under autogenous pressure and at a temperature of 50° to 200° C. in the presence of an acidic catalyst of the Friedel-Crafts type.

11. A process for the production of 1-ethoxy-1-cyanohexane comprising reacting dimethyl hexal with anhydrous hydrogen cyanide under autogenous pressure and at a temperature of 50° to 200° C. in the presence of an acidic catalyst of the Friedel-Crafts type.

References Cited in the file of this patent

UNITED STATES PATENTS

| | | |
|---|---|---|
| 2,326,373 | Long | Aug. 10, 1943 |
| 2,436,286 | Brooks | Feb. 17, 1948 |
| 2,449,471 | Gresham | Sept. 14, 1948 |
| 2,519,957 | Erickson | Aug. 22, 1950 |
| 2,736,741 | Schmidle | Feb. 28, 1956 |

FOREIGN PATENTS

| | | |
|---|---|---|
| 854,504 | Germany | Nov. 4, 1952 |

OTHER REFERENCES

Post: The Chemistry of the Aliphatic Orthoesters (1943), p. 101.

UNITED STATES PATENT OFFICE

CERTIFICATE OF CORRECTION

Patent No. 2,794,042                                                                        May 28, 1957

Charles C. Tanona et al.

It is hereby certified that error appears in the printed specification of the above numbered patent requiring correction and that the said Letters Patent should read as corrected below.

Column 1, lines 71 and 72, and column 4, lines 30 and 31, for "1-ethoxy-1-cyanohexane", each occurrence, read --1-methoxy-1-cyanohexane--.

Signed and sealed this 17th day of September 1957.

(SEAL)
Attest:
KARL H. AXLINE

Attesting Officer

ROBERT C. WATSON
Commissioner of Patents